Patented Feb. 15, 1927.

1,617,515

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

ARC SHIELD.

No Drawing.    Application filed April 20, 1921.  Serial No. 463,071.

This invention relates to arc shields for magnetic blowout devices such as are commonly employed for electric switches to disrupt the arcs drawn between the contacts thereof.

Such shields are subjected to high temperature by the arcs to be disrupted and to intermittent heating and cooling at rapid rates. Thus the shields must comprise a highly refractory material to prevent cracking and spalling thereof. On the other hand the material employed must have a high specific resistance and heretofore it has been found necessary to sacrifice to an undesirable degree the heat resisting properties of the materials employed for the required specific resistance thereof notwithstanding the many and persistent efforts to provide a more satisfactory material.

The present invention has among its objects to provide an arc shield of a composition having the requisite specific resistance and at the same time having a materially greater heat resistance.

Another object is to provide an arc shield of such composition as to practically eliminate cracking and spalling thereof even under severe service conditions.

Other objects and advantages will be apparent to those skilled in the art.

According to the present invention it is proposed to form arc shields of granular silicon carbide bonded with a semi-refractory clay, preferably in the proportions hereinafter set forth. While the success of this material has not been fully accounted for, repeated and severe tests thereof have proven that it not only possesses a suitable specific resistance but also such heat resisting properties as to render the same far more durable than the known materials now in use. Probably the success of the material is largely due to its porosity and low coefficient of expansion.

In practice very satisfactory results have been obtained with such a material sold under the trade name of "Carbofrax C" which material is understood to ordinarily comprise about 92 per cent silicon carbide and 8 per cent semi-refractory clay although a report on certain test bricks of such material shows a carborundum content of about 95 per cent. It is accordingly preferred to employ silicon carbide and bonding clay in about the proportions specified although it is to be understood that further experiments may establish the fact that strict adherence to such proportions is not essential and it is believed that materials varying between 85 to 95 per cent silicon carbide and 15 to 5 per cent bonding clay will prove more satisfactory than the materials now employed.

The desired shield may be formed of this material in any preferred manner as for example pressing the material into the desired form and then burning the same.

What I claim as new and desire to secure by Letters Patent is:

1. An arc shield comprising silicon carbide bonded with a semi-refractory clay.

2. An arc shield comprising silicon carbide bonded with a semi-refractory clay in approximately the proportions of 92 per cent silicon carbide and 8 per cent clay.

3. An arc shield comprising the silicon carbide product Carbofrax C.

In witness whereof, I have hereunto subscribed my name.

CLARENCE T. EVANS.